United States Patent
Deutschmann

(10) Patent No.: US 6,478,230 B1
(45) Date of Patent: Nov. 12, 2002

(54) TERMINAL FOR CHIP CARDS

(75) Inventor: Ingo Deutschmann, Leuna (DE)

(73) Assignee: Gemplus, Cedex (FR)

( * ) Notice: Subject to any disclaimer, the term of this patent is extended or adjusted under 35 U.S.C. 154(b) by 0 days.

(21) Appl. No.: 09/623,948

(22) PCT Filed: Mar. 6, 1999

(86) PCT No.: PCT/DE99/00659

§ 371 (c)(1),
(2), (4) Date: Nov. 1, 2000

(87) PCT Pub. No.: WO99/48038

PCT Pub. Date: Sep. 23, 1999

(30) Foreign Application Priority Data

Mar. 13, 1998 (DE) ..................... 298 04 510 U

(51) Int. Cl.[7] .............................. G06K 19/06
(52) U.S. Cl. ...................... 235/492; 235/380
(58) Field of Search ................. 235/492, 380

(56) References Cited

U.S. PATENT DOCUMENTS

| 5,034,596 A | 7/1991 | Utsunomiya |
| 5,596,718 A | 1/1997 | Boebert |

FOREIGN PATENT DOCUMENTS

| DE | 44 06 602 A1 | 9/1995 |
| EP | 0 347 894 A2 | 12/1989 |
| EP | 0 552 392 A1 | 7/1993 |
| EP | 0 668 579 A2 | 8/1995 |
| FR | 2 616 938 A | 12/1988 |
| WO | 95 26085 A | 9/1995 |

OTHER PUBLICATIONS

"Der Zinker, Chipkarten–Terminal Mit Seriellem Anschlus" by C. Meyer, Technical Periodicals CT 12/94.

*Primary Examiner*—Harold I. Pitts
(74) *Attorney, Agent, or Firm*—Burns, Doane, Swecker & Mathis, L.L.P.

(57) ABSTRACT

The invention pertains to a terminal for chip cards which contain a micro controller. The chip card terminal contains a contact device for chip cards and an integrated keyboard unit and is connected with the interface of a computer system through a first data path, which allows a bi-directional exchange of data. Sufficient security is provided through the integrated keyboard by the fact that the chip card terminal contains a gate circuit, which is controlled by a control system. The gate is connected with the chip card through a contact device by means of a second data path, is connected with the integrated keyboard unit by means of a third data path, and is connected with the interface of a computer system by means of the first data path. The computer system generates the data traffic to the chip card through the first data path and additionally gives the command through the first data path for inserting identification information from the third data path into the resulting second data path, which effects the control of the gate circuit.

14 Claims, 2 Drawing Sheets

TERMINAL FOR CHIP CARDS

FIELD OF THE INVENTION

Figure 1:
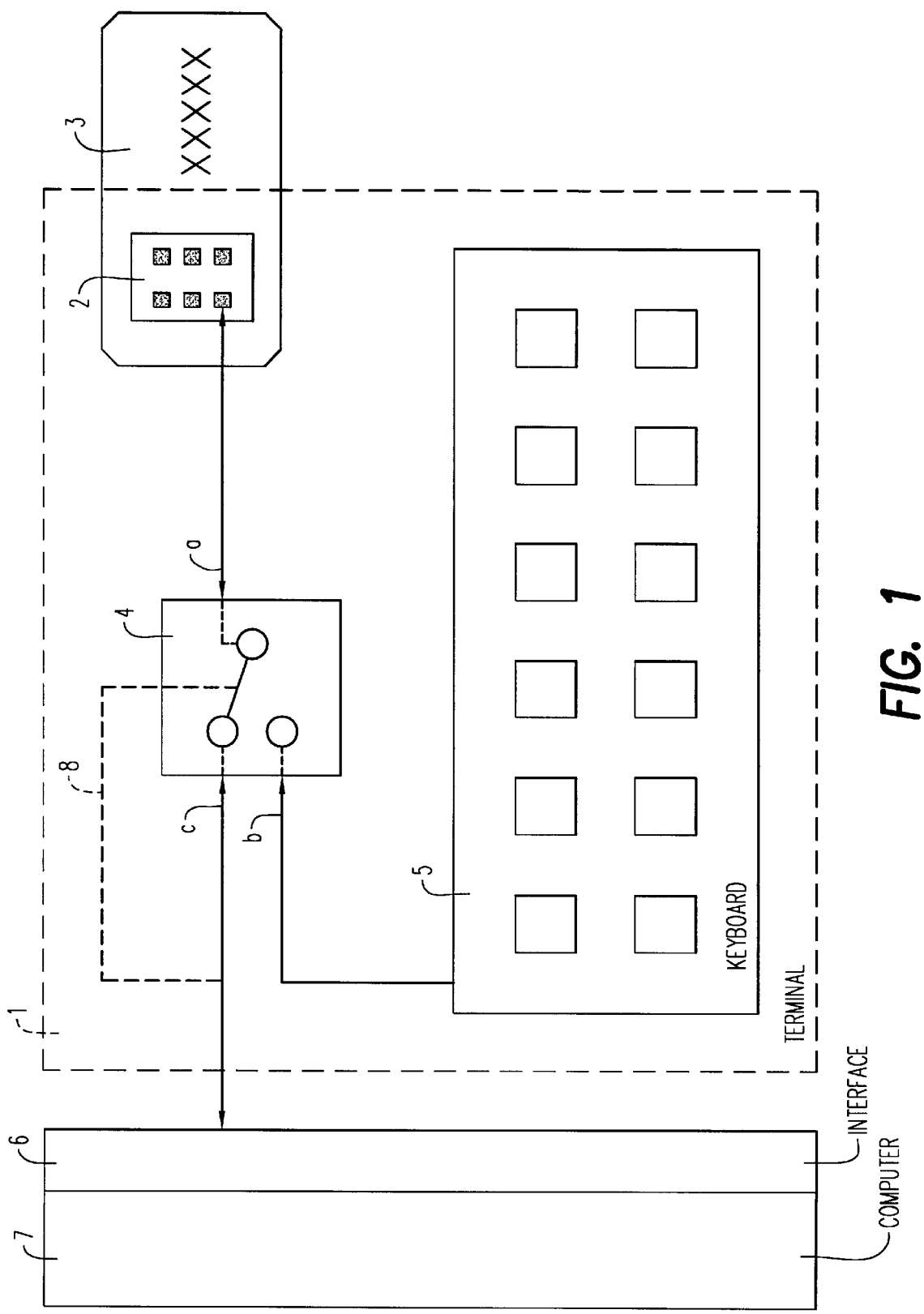

The invention designates a terminal for chip cards, which are configured as microprocessor cards, primarily for the input of the identification number using an integrated keyboard into a micro controller located in this microprocessor card for the authentication of the user of this microprocessor card.

BACKGROUND OF THE INVENTION

Several control devices are known from the IPC (international patent classification) G07. In connection with financial transactions, coded identity cards are correspondingly grouped under G07F 7/08. Chip cards are being used to a continuously greater degree in the consumer area, for example, as so-called "electronic wallets" or for the electronic signing of contracts. For this, the chip cards are inserted into suitable chip card read/write units. The required control logic for this is classified in the class G06F17/60. For example, the block printing, EP0668579A2, describes the usage of chip cards (smart cards) for the transfer of money.

Chip cards can be equipped, among other things, with authentication. This requires that the person, who wants to use certain chip card functions, for example, the loading of an amount of money for money cards or signing for signature cards, must identify himself or herself to the chip card by means of a personal identification number (PIN). The checking of the authorization of the user using digital information is grouped under H04L 9/32. This identification must insure that only the person authorized, meaning the authenticated user, can use this chip card. This is normally done by the entry of identification by the user, that is by the input of a PIN using a keyboard. The block printing of EP0552392A1 describes, for example, a procedure for the mutual authentication of a chip card and of a terminal. This is to insure, in particular, that the identification entered can be securely transferred to the chip card.

This PIN is, however, due to security reasons not to be entered using a computer system connected with the chip card terminal, normally a PC or another CPU, but with a keyboard integrated in the chip card terminal. The block printing of DE4406602A1 identifies, for example, security equipment, which is meant for the identification and authentication of communications partners, with a keyboard for entering a PIN, which equipment exchanges data with chip cards.

The physical appearance and the number and arrangement of the contacts of the chip cards, which are widely available, are standardized, see ISO/IEC 7816-1,2. In addition, the electronic signals and transfers protocols are standardized, ISO/IEC 7816-3. Also, the commands for data exchange with chip cards, ISO/IEC 7816-4, in particular the input of a PIN for the authentication of a user to the chip card are partially standardized. The block printing EP 347894 describes a typical chip card terminal. It consists of a keyboard, a microprocessor, a chip card read/write unit, a display and a printer. The purpose of the microprocessor in this case is, among other things, to allow the input of the PIN using the chip card terminal keyboard, to process this input and to pass it on to the chip card and the execution of the chip card protocol according to ISO/IEC 7816-3.

Since the prices for the chip cards are minimal, the biggest hindrance to the greater use is due to the manufacturing costs of the chip card terminals. This exists due to the fact that expensive components, in particular microprocessors, are used to produce the conventional chip card terminals. As shown in relevant technical periodicals (CT 12/94) chip card terminals can also be built without microprocessors by using the parallel port of a personal computer. Similar suggestions for the serial port are also known, Markus Kuhn 1996. In addition to the control of the chip card protocol by the computer system, a significant difference compared to the current chip terminal with a microprocessor, is in the treatment of the PIN, which is input into the computer system, personal computer. This is associated with the disadvantage that this can be read or modified without authorization there and therefore is no longer sufficiently secure.

SUMMARY OF THE INVENTION

In order to reduce the above named costs of a conventional chip card terminal and still insure a secure input of the PIN using a keyboard integrated in a chip card terminal, it is the task of the invention to develop a chip card terminal, which requests the PIN without the use of a microprocessor and passes this directly to the chip card, which allows this to be protected against modification and data interrogation.

The essence of the invention lies in the use of a gate circuit inside of a simple chip card terminal, which is emplaced between the interface to the computer system and the I/O contact of the chip card and is controlled by the computer system, which inserts the identification information, entered using the integrated keyboard, into the chip card protocol.

The advantages of the invention are in the simple logic, which is due to the gate circuit, required for the sufficiently secure insertion of the identification information in the chip card. This allows the construction of the chip card terminal to be significantly simplified and, due in particular to the ability to do without a microprocessor, cheaper components can be used. Since the chip card protocol is generated in the computer system, a high degree of flexibility is attained in this respect.

Further developments of the invention result in further simplifications of the logic through specific adjustments to the serial and parallel ports of the PC. The extensive integration of all necessary components of a chip card terminal in a logic building block, allows a very inexpensive production of these, which will significantly support the use of the chip card. The integration of this building block into the keyboard of the computer system is also an advantage.

BRIEF DESCRIPTION THE DRAWINGS

The invention is explained in more detail using, as a configuration example,

FIG. 1 as the principle construction of the chip card terminal and

Figure 2:
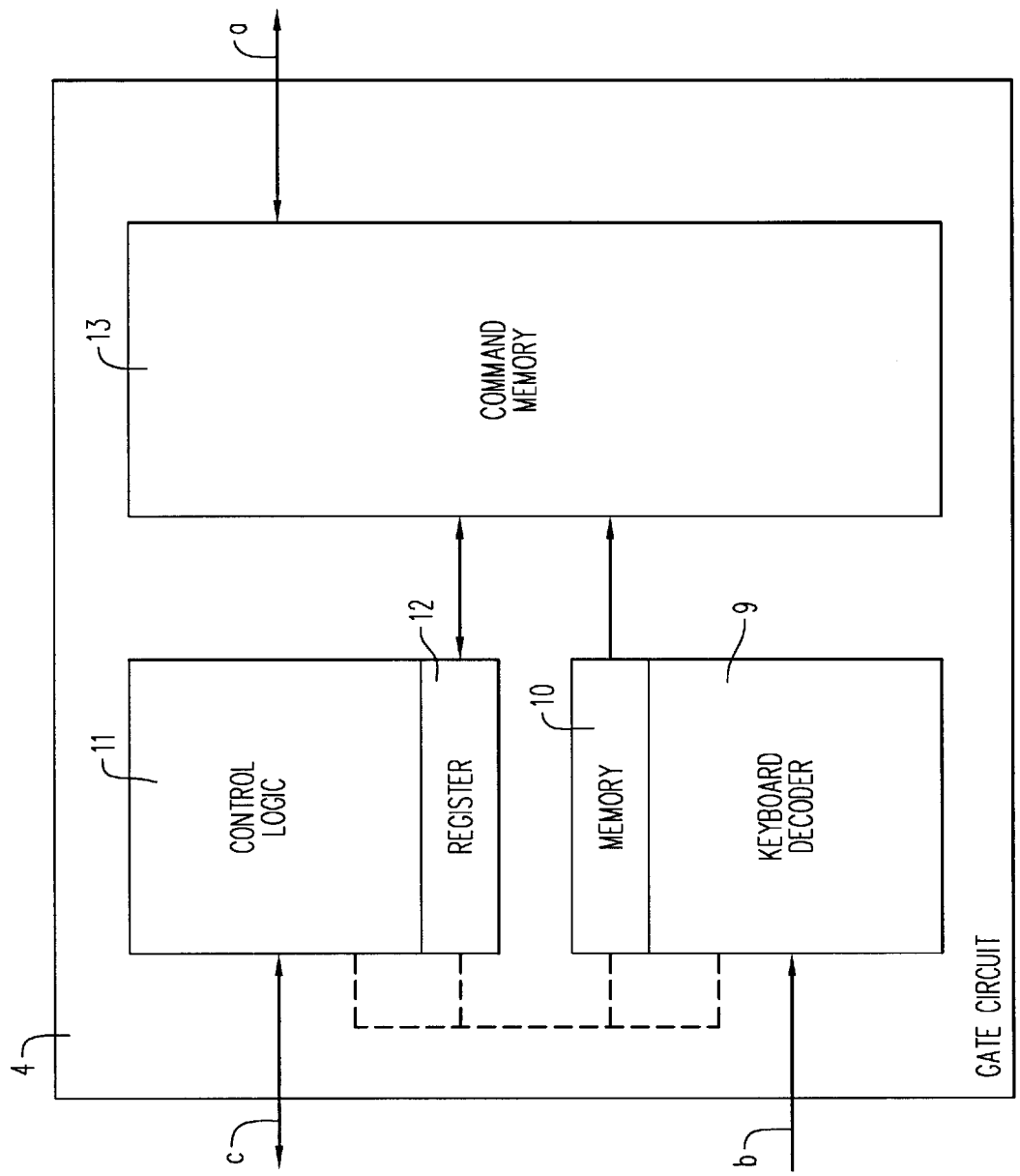

FIG. 2 as the principle construction of the gate circuit.

DETAILED DESCRIPTION

According to FIG. 1 a chip card terminal 1 consists of a contact device 2 for chip cards 3, which device is connected with a gate circuit 4 by means of a data path a, with an integrated keyboard unit 5, which is connected with gate circuit 4 by means of a data path b, with a data path c, which connects the gate circuit 4 and an interface 6 of a computer system 7 and the control system 8, which is ran by the computer system 7 by means of the data path c, for the gate circuit 4.

The manner of function of the chip card terminal 1, is so designed that the actual data traffic is carried out over the data paths a and c, based on the chip card protocol, between the chip card 3 and the computer system 7, and this is generated by the computer system 7. The integrated keyboard unit 5 provides, by means of the input of the user, the required digital identification information and a PIN as well as optionally its check sum, with which the chip card 3 can authenticate the user as authorized. The computer system 7 generates, based on the chip card protocol, the data traffic to the chip card 3 through the data path c and also gives the command through data path c, which command provides the control system 8 for the gate switch 4, for the insertion of the identification information from data path b into the resulting data path a.

The chip card terminal 1 provides all required sources—power, clock etc.—for the operation of the microprocessor by means of a contact device. Optionally, it is possible to configure the gate circuit 4 with a FIFO function—first in first out memory. The data path c is configured as a one or multiple artery and offers the possibility of bi-directional data exchange. It is connected preferably with a standardized parallel or, in a different configuration, with a serial port of the computer system 6 in a special configuration of the PC. The control 8 of the gate circuit 4 is done through a special control line within the data path c or through suitable filtering of the data in this data path c. It is advantageous and possible, to integrate all logic components, required in the chip card terminal,—gate circuit 4, keyboard logic and memory, clock generation for the chip card etc.—in a suitable logic circuit or a free programmable gate array (FPGA). It is also possible to integrate the chip card terminal 1 into the keyboard of the computer system 7 using this and the keyboard interface.

The manner of functioning of the chip card terminal 1 is such that the actual data traffic, based on the chip card protocol, is carried out between the chip card 3 and the computer system 7, and this is controlled by the computer system 7.

According to FIG. 2, the gate circuit 4 can consist of, in detail, a keyboard decoder 9 connected with data path b, which decoder is connected with an identification information memory 10, of a control logic 11—connected with data path c—with control register 12, which is internally connected with the keyboard decoder 9 and/or the identification information memory 10, and of command memory 13, which serves as a gate connected with data path a. The command memory 13 is optionally configured with a FIFO function.

Through the connection of the keyboard decoder 9 with the control logic 11, it is possible to report special inputs of the user such as keys "*" and '#' to the control logic 11. Through the connection of the identification information memory 10 with the control logic 11, it is also possible to interrogate the number of input positions of the identification information by means of the control logic 11. This then deposits this information in the control register 12, which can be interrogated by the computer system through data path c. Further, the control register 12 contain the chip card communications parameters according to ISO/IEC 7816 3, which can be set from the computer system.

The control logic 11 guarantees various transmission scenarios.

I. Transparent Mode

In this mode the computer system receives data from the chip card or can send data to the chip card. In doing this the commands are simply passed through the command register 12.

II. Fill Identification Information Memory 10

The identification information memory 10 receives the identification information entered by the user through the keyboard decoder 9 from the keyboard unit. This is dumped in the identification information memory 10 for further use. A termination symbol can be entered by the user with a special key of the keyboard unit. This termination symbol is reported to the control logic 11, which deposits the information in the control register 12, that identification information was entered. In addition, the computer system can interrogate the control logic 11 for the number of positions in the identification information, for example, to recognize an entry, which is too short, and request the user to make a new entry.

III. Erase Identification Information Memory 10

The computer system sends the command "erase identification information" to the control logic 11, which then resets the identification information memory 10. This is, for example, advantageous if the user makes an incorrect entry. The identification information memory 10 can also be erased with a special key on the keyboard unit.

IV. Set Control Register 12

The computer system sends the command "SetFlag" to the control logic 11, then the control logic 11 fills the control register 12 with the values sent. This results in the transmission of the following values: CRC and parity. These are then used when sending the "Verify" command as settings for the protocol.

V. Get Status

The computer system sends the command "GetStatus" to the control logic 11, this then sends as the return value the status information of the control register 12—number of positions entered, errors found.

I. Output Mode

If an authentication of the user from the chip card for a certain command is necessary—for example as shown in ISO/IEC 7816 4 section 6.12—then the gate circuit is switched to the output mode by the command "SetOutput," which is sent by the computer system. This means that the computer system initially informs the control logic 11 about the following "Verify" command. The command "SetOutput" also contains information about the position of the command, after which the identification information of the identification information memory 10 is to be displayed. Following this, the computer system sends the full " Verify" command, according to ISO/IEC 7816-4 page 26 ff. If this is clocked by the command register 13, then the control register takes action so that the identification information from the identification information memory 10 is entered into the command flow of data path a. Thus, it is possible that, depending on control register 11, additional bytes will be attached to the "Verify" command or exchanged. This is, for example, necessary in order to attach any possible CRC bytes as well as to set the parity. It is also possible that the control logic 11, as a reaction to the appearance of a—previously set in the control logic 11—command sequence of the computer system, automatically inserts the identification information as of this position—also to be set previously—of the command sequence. Thus, the otherwise explicit switching to the output mode VI by the computer system is no longer necessary.

Reference symbols used

1 chip card terminal
2 contact device
3 chip cards
4 gate circuit 5 keyboard unit
6 interface
7 computer system
8 control system
9 keyboard decoder
10 identification information memory
11 control logic
12 control register
13 command memory
a data path to chip card
b data path to keyboard unit
c data path to computer system

What is claimed is:

1. Terminal for chip cards, which contain a micro controller, comprising a contact device for chip cards, an integrated keyboard unit for entry of identification information, a first data path for connection with an interface of a computer system which allows a bi-directional data exchange, and a gate circuit controlled by a control system, said gate circuit being connected with a chip card through the contact device by means of a second data path, connected with the integrated keyboard unit by means of a third data path, and connected with the interface of a computer system by means of the first data path, wherein commands and data exchanged between the computer system and the chip card pass through said gate circuit via the first data path and the second data path, and wherein the gate circuit is responsive to a command from a computer system to insert the identification information from the third data path into data being transmitted to a card via the second data path.

2. Terminal for chip cards according to claim 1, wherein the gate circuit communicates with a computer system through the first data path by means of one of a standardized serial interface, a standardized parallel interface or a standardized keyboard interface.

3. Terminal for chip cards according to claim 1, wherein the gate circuit comprises an integrated logic circuit including a keyboard decoder, an identification information memory, controller logic, a control register and a command memory.

4. Terminal for chip cards according to claim 1, wherein the chip card terminal is integrated into the keyboard of the computer system, said integrated keyboard unit is connected with the gate circuit through the data third path, and the gate circuit is connected through the first data path with the interface in the form of a keyboard interface.

5. Terminal for chip cards according to claim 1, wherein the gate circuit comprises a keyboard decoder connected with the third data path, an identification information memory connected with said decoder, a control logic connected with the first data path, a control register which is connected internally with the keyboard decoder and/or the identification information memory, and a command memory connected with the second data path.

6. A terminal for chip cards according to claim 5, wherein said command memory functions as a FIFO memory.

7. A terminal for chip cards according to claim 1, wherein said gate circuit is responsive to a command from a computer system to interrogate the number of data elements in the identification information and inform the computer system of the result.

8. A terminal for microprocessor cards, comprising:
a contact device for communicating with a microprocessor card via a first data path;
an integrated keyboard that transmits information over a second data path;
an interface for communicating with a computer via a third data path; and
a gate circuit that selectively connects said first data path to said second or third data path to enable a microprocessor card to receive information entered via said keyboard and to exchange data with said computer, said gate circuit including:
an information register for storing information entered via said keyboard and transmitted over said second data path;
a control register for storing data that is provided to and/or from said computer via said third data path; and
a control logic that is responsive to commands received from the computer for selectively providing information stored in said information register to a microprocessor card via said data path and for enabling the microprocessor card and the computer to exchange data via said control register.

9. The terminal of claim 8, wherein said control logic loads data in said control register pertaining to information stored in said information register.

10. The terminal of claim 9 wherein said data includes the number of data elements in said information.

11. The terminal of claim 9, wherein said control logic is responsive to a special input entered via said keyboard to load said data.

12. The terminal of claim 8 wherein said gate circuit further includes a command register that receives data from said information register and said control register, and provides said data to said first data path.

13. The terminal of claim 8 wherein said control register is further responsive to commands from the computer to erase the information stored in said information register.

14. The terminal of claim 8 wherein said control logic attaches information stored in said information register to a command from the computer that is being forwarded to a microprocessor card.

* * * * *